March 29, 1960   F. C. ROBINSON ET AL   2,930,109
ELECTRICAL CAPACITORS
Filed April 30, 1956
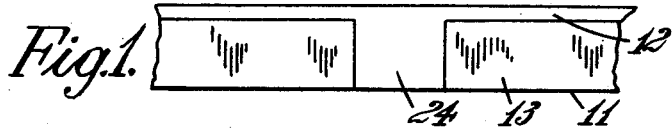
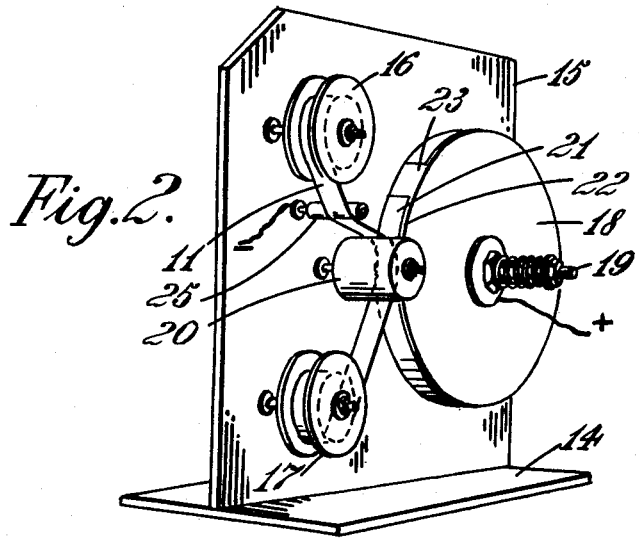
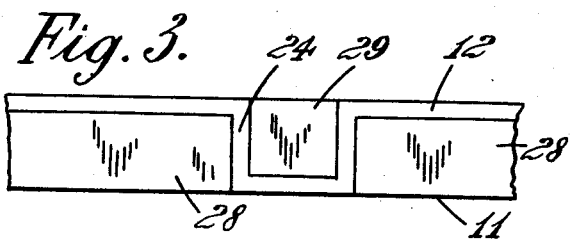
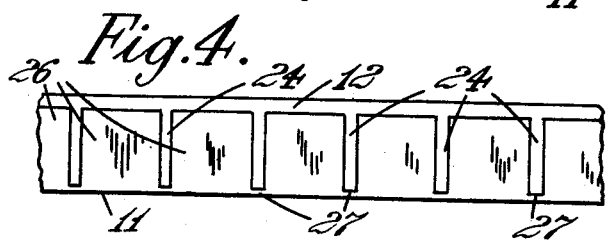
INVENTORS
FREDERICK C. ROBINSON
NORMAN H. BENTLEY
By *Watson, Cole, Grindle & Watson*
ATTORNEYS United States Patent Office 2,930,109
Patented Mar. 29, 1960

2,930,109

ELECTRICAL CAPACITORS

Frederick Chetham Robinson, and Norman Hilton Bentley, London, England, assignors to A. H. Hunt (Capacitors) Limited, London, England, a British company Application April 30, 1956, Serial No. 581,612

Claims priority, application Great Britain May 3, 1955

1 Claim. (Cl. 29—25.42)

This invention relates to the manufacture of electrical capacitors, and its main object is to facilitate the winding of capacitors consisting of rolled strips of flexible dielectric material, in which the electrodes are provided by coatings of metal deposited on the faces of the dielectric strip material, with metal coatings of opposite polarity separated in the finished capacitor by one or more layers of the dielectric. In the normal capacitor of this type, special precautions have to be taken at the beginning and end of the wind, to prevent the metal on the cut ends of the strips from forming a short circuit. Various means of avoiding a short circuit are commonly employed, such as inserting a piece of plain dielectric material between the cut ends, or folding back one of the cut ends so that the metallic layer is inside the fold, or, in the case of multilayer units having interleaving strips of plain dielectric, cutting the electrode-carrying strips slightly shorter than the unmetallised interleaving strips, so that the ends of the metal-carrying strips are protected from each other by the interleaving material. All these operations cause waste of time in winding.

According to the present invention, in a method of making electrical capacitors from flexible dielectric strip material bearing metallisation to constitute the capacitor electrodes, at least one metal-bearing surface of the dielectric strip is provided at intervals with gaps in the metallisation which extend across the width of the strip, the strip material being cut off at the end of each wind by a transverse cut passing through one of said gaps.

If the electrode metallisation of one polarity is provided with gaps in this way, all the dielectric layers in the wind can be cut off together at one of those gaps in a single operation at the end of the wind, without any risk of shorting contact between the electrodes of opposite polarity occurring at the cut ends.

Each of the metallised dielectric strips used in the winding will normally have an unmetallised margin along one edge, which can be produced by the electrical demetallisation technique employing an electrode wheel for burning off the metallisation as described in British patent specification No. 563,080. The gaps across the dielectric may be formed at the same time as the margin is demetallised by using an electrode wheel which is the full width of the dielectric strip, but has only a conducting rim in contact with the metallised dielectric to form the unmetallised margin, together with a further conducting portion at at least one point around its circumference in the form of a transverse rib or segment extending the width of the wheel to provide the unmetallised gaps. A wheel with one such transverse segment will form one gap for every revolution of the wheel, and by choosing a wheel of suitable diameter it can be arranged that the distance between gaps corresponds to any desired capacity in the finished capacitor.

Various methods of carrying the invention into effect will now be described by way of example, reference being had to the accompanying drawings, in which:

Figure 1 shows a strip of metallised dielectric provided with the gaps as aforesaid.

Figure 2 is a perspective view of an apparatus for producing the gaps and,

Figures 3 and 4 show different arrangements of gaps on the dielectric strip.

Referring firstly to Figures 1 and 2, thin flexible strip dielectric 11, either paper or a suitable synthetic plastic material, which is initially metallised all over one face 13 with a suitable metal such as aluminum, has an unmetallised margin 12 produced down one edge by moving it past a rotary demetallising electrode wheel with the metallised face in contact with the periphery thereof. Figure 2 shows the apparatus used, which comprises a frame having a base 14 and an upstanding back plate 15, a supply spool 16 and a take-up spool 17 mounted on the back plate, and a rotary demetallising wheel 18 carried on a spindle 19 projecting from the back plate. The metallised dielectric strip 11 passes into contact with the demetallising wheel periphery on its way from the supply to the take-up spools, a pressure roller 20 serving to keep the strip pressed firmly into contact with said wheel periphery.

The demetallising wheel 18, which extends the full width of the strip 11, has a periphery which is mainly of non-conducting material 21 but with a conducting rim 22, at one side to form the unmetallised margin; it also has a transverse conducting rib or segment 23 at one place around its circumference which extends the full width of the wheel and produces by demetallisation a gap 24 (Figure 1) across the strip metallisation at each revolution of the wheel. Demetallisation is achieved in known manner by electrifying the conducting portions 22, 23 of the wheel periphery while an earthing roller 25 on the back plate 15 is maintained in contact with the metallised face of the dielectric. The result is thus a metallised strip of dielectric with a bare margin 12 and gaps 24 across the metallisation at intervals.

For winding a capacitor from this material, a conventional winding machine is set up with a roll of dielectric 11 with interrupted metallisation on a supply spindle at the top of the machine, and a normal metallised roll (provided with edge margin, but no gaps) on another supply spindle underneath, with or without interleaving rolls on other supply spindles between, according to the voltage of the capacitor to be wound.

It will be understood that the two metallised strips are arranged with their demetallised margins on opposite sides, so that the terminal connections to the capacitor roll can be made in the well-known manner after winding. The edges of the metallised rolls may, if so desired, be turned over as described in British patent specification No. 558,688 so that an extra robust terminal contact can be made to the ends of the rolls after winding if the capacitor is intended for arduous working conditions.

The winding of capacitor units then becomes extremely simple. The operator starts the wind by trapping all the dielectric layers on the winding spindle at a point corresponding to one of the gaps 24 in the top layer, and winds until the next gap 24 reaches the spindle, when the dielectric layers are all cut through together at the gap. The unit is then secured in any conventional manner, such as by a sticker of gummed paper, removed from the spindle, and the next wind started, without the operator having to observe any of the usual precautions against short circuits at the cut ends.

The rolls of metallised dielectric 11 provided with gaps 24 are particularly useful when winding with double-spindle machines. Such machines have two spindles mounted at diametrically opposite stations on a wheel, each capacitor unit being wound on the spindle which is nearest the operator at that time, and the dielectric strips on their way to this spindle pass just above the other or rearward winding spindle. When the winding of the first capacitor unit is finished, the dielectric strips are trapped on the rearward spindle by the use of a conventional type of pin, before cutting them to complete the first unit. This avoids the operation of picking up loose ends and putting them on the winding spindle at the beginning of each wind. After removing the first capacitor unit from the forward spindle, the rear spindle is pulled forward on the wheel for winding the second unit, while the other spindle goes back ready to take up the strips for winding the third unit and so on. By making the gap in the metallisation slightly greater than the distance between the two winding spindles, metallised dielectric rolls of this type can be used in the winding of capacitors on the double-spindle machine very quickly and cheaply.

Although in the method described above, the whole of the metal in the gaps 24 is removed by the demetallising segment 23 of the wheel 18, it will be understood that this is not essential provided that, as in Figure 3, enough metal is removed to isolate the remaining portion 29 entirely from the electrode metallisation 28. To produce the pattern shown in Figure 3, the conducting segment 23 of the demetallising wheel periphery is replaced by a pair of circumferentially spaced axial conducting ribs joined by a short radial rib segment at the side of the wheel periphery opposite to the rim 22 that produces the unmetallised margin.

So far in the method described, it has been assumed that the distance between consecutive gaps 24 in the metallisation, corresponding to the length of the periphery of the demetallising electrode, is the equivalent of the length of metallised dielectric necessary to produce capacitor units of the capacity required. To produce units of different capacities, it would therefore be necessary to have a stock of prepared rolls with different spacings between the burnt-out gaps.

However, as an alternative, and as shown in Figure 4, the metallisation may be burnt out to give gaps 24 at short intervals corresponding to a small increment of capacity, so that any desired capacity can be wound by using a strip having the correct number of short lengths of metallisation 26. The control of winding length can then be made automatic by means of a photo-electric cell and batch-counter, which can be set to stop the winding machine after any desired number of burnt-out gaps 24 have passed the photoelectric cell, and the machine operator merely has to remove the finished unit and restart the machine for the next one.

Since an accurate and virtually instantaneous response can be obtained from an electronic control system such as envisaged above, the burnt-out gaps may in this instance be made very narrow so that there is not an appreciable waste of dielectric material involved.

Nevertheless, when making terminal connection to the wound capacitor unit by the usual means of copper-spraying the ends of the roll, such as described in British Patents Nos. 560,946 and 619,364, unless this is done very carefully, there is a danger that some of the short capacity elements 26 may not be adequately connected. Therefore, as a further modification, it is proposed that such unmetallised gaps 24 shall not extend quite the full width of the paper, but that a thin metallised strip 27 shall be left all along one edge, that is to say the edge opposite to that at which the unmetallised margin 12 occurs. If this strip 27 is made narrower than the unmetallised edge margin of the other dielectric film, with which it comes into line when the capacitor is wound, there will be no danger of a short circuit at the point where the films are cut to finish a unit, and the continuous metallised edge will ensure that all the capacity elements 26 are properly connected.

Although the production of unmetallised margins and gaps has been described hereinbefore as being attained by electrical demetallisation, the invention is not restricted to this and other methods, such as masking during deposition of the metal, may be employed. Aluminum is mentioned as a usual metal, but the invention is applicable to dielectric strips bearing other metals.

We claim:

A process for the production of a roll-type capacitor from at least two stock reels of strip dielectric bearing metalization to constitute the capacitor electrodes comprising the steps of providing one of the dielectric strips with unmetallised areas at intervals in the metalization thereon and another strip of dielectric material with a metalized surface on one face and provided with a continuous edge margin, said unmetalized areas on said one strip extending from said margin transversely across said strip a distance such that the metalization connecting adjacent portion on said one strip is narrower than the unmetalized margin on said other strip, pulling lengths of the strips off the reels simultaneously and rolling them together contiguously as they are pulled off and severing said lengths from the stock reels at the end of a winding of each capacitor by a transverse cut which passes through one of said unmetalized areas in the metalization of said one strip so as to free the wound capacitor for removal.

References Cited in the file of this patent

UNITED STATES PATENTS

| | | |
|---|---|---|
| 2,731,705 | Grouse | Jan. 24, 1956 |
| 2,731,706 | Grouse | Jan. 24, 1956 |
| 2,738,567 | Grouse | Mar. 20, 1956 |